United States Patent US 11,956,621 B2
Tamaki (45) Date of Patent: Apr. 9, 2024

(54) INFORMATION PROCESSING APPARATUS, INFORMATION PROCESSING METHOD, AND INFORMATION PROCESSING PROGRAM

(71) Applicant: SONY GROUP CORPORATION, Tokyo (JP)

(72) Inventor: Hiroshi Tamaki, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 219 days.

(21) Appl. No.: 17/416,631

(22) PCT Filed: Dec. 26, 2019

(86) PCT No.: PCT/JP2019/051058
§ 371 (c)(1),
(2) Date: Jun. 21, 2021

(87) PCT Pub. No.: WO2020/138257
PCT Pub. Date: Jul. 2, 2020

(65) Prior Publication Data
US 2022/0060841 A1 Feb. 24, 2022

(30) Foreign Application Priority Data
Dec. 28, 2018 (JP) ................. 2018-246622

(51) Int. Cl.
H04S 7/00 (2006.01)
(52) U.S. Cl.
CPC ............ H04S 7/304 (2013.01); H04S 7/301 (2013.01); H04S 7/308 (2013.01); H04S 2420/01 (2013.01)

(58) Field of Classification Search
CPC .......... H04S 7/304; H04S 7/301; H04S 7/308; H04S 2420/01; H04S 1/005; H04S 1/00; H04S 7/00
USPC .......................................... 381/303, 310, 311
See application file for complete search history.

(56) References Cited

U.S. PATENT DOCUMENTS 9,544,706 B1* 1/2017 Hirst ..................... H04S 7/304
2006/0037067 A1 2/2006 Morris et al.
2011/0145930 A1 6/2011 Gnech
2013/0177166 A1 7/2013 Agevik
(Continued)

FOREIGN PATENT DOCUMENTS

CN 1685762 A 10/2005
CN 103329576 A 9/2013
(Continued)

OTHER PUBLICATIONS

International Search Report prepared by the Japan Patent Office dated Jan. 30, 2020, for International Application No. PCT/JP2019/051058.

Primary Examiner — Yosef K Laekemariam
(74) Attorney, Agent, or Firm — SHERIDAN ROSS P.C.

(57) ABSTRACT

An information processing apparatus according to the present disclosure includes an executing unit that associates a head-related transfer function corresponding to a user with an identifier that identifies equipment that is used by the user and a providing unit that provides the head-related transfer function and the identifier associated with the head-related transfer function to a providing destination to which the head-related transfer function corresponding to the user is provided.

13 Claims, 10 Drawing Sheets

(56) References Cited

U.S. PATENT DOCUMENTS

2014/0006562 A1* 1/2014 Handa .................... H04L 67/02
709/219
2018/0234521 A1* 8/2018 Tan .......................... H04R 5/04

FOREIGN PATENT DOCUMENTS

| JP | 2003-153398 | 5/2003 |
| JP | 2010-118978 | 5/2010 |
| JP | 2014010577 A | 1/2014 |
| TW | 200738038 A | 10/2007 |

* cited by examiner

INFORMATION PROCESSING APPARATUS, INFORMATION PROCESSING METHOD, AND INFORMATION PROCESSING PROGRAM

CROSS REFERENCE TO RELATED APPLICATIONS

This application is a national stage application under 35 U.S.C. 371 and claims the benefit of PCT Application No. PCT/JP2019/051058 having an international filing date of 26 Dec. 2019, which designated the United States, which PCT application claimed the benefit of Japanese Patent Application No. 2018-246622 filed 28 Dec. 2018, the entire disclosures of each of which are incorporated herein by reference.

FIELD

The present disclosure relates to an information processing apparatus, an information processing method, and an information processing program. In particular, the present disclosure relates to the use of a head-related transfer function.

BACKGROUND

There is a technology that is used for three-dimensionally reproducing sound images in a pair of headphones or the like by using a head-related transfer function that mathematically expresses how an ear receives sound from the sound source.

Because the head-related transfer function varies greatly between individuals, it is preferable to use the head-related transfer function that is generated for each person. For example, there is a known technology for generating a three-dimensional digital model (hereinafter, referred to as a "3D model") of the head region based on a captured image of the user's auricle and calculating a head-related transfer function of the user from the generated 3D model.

CITATION LIST

Patent Literature

Patent Literature 1: U.S. Pat. No. 9544706

SUMMARY

Technical Problem

According to the conventional technology, because the head-related transfer function that has been individually calculated in accordance with each of the users can be used for information processing, it is possible to enhance a feeling of localization of the sound image.

However, with the conventional technology described above, it is not always able to appropriately use the head-related transfer function calculated for each user. For example, there may be a case in which the user desires to flexibly use the head-related transfer function, such as using the own head-related transfer function with respect not only a stand-alone application (music playback application, etc.) but also a plurality of applications installed in a smartphone. Furthermore, the head-related transfer function can further enhance realistic sensations or give an accurate feeling of localization if adjustment is made in accordance with the situation that is actually used or audio equipment or the like that is used by the user. However, the conventional technology only calculate a head-related transfer function for each user and does not perform a process of changing a usage mode of the head-related transfer function in accordance with the situation such that the user can flexibly use the head-related transfer function.

Thus, the present disclosure proposes an information processing apparatus, an information processing method, and an information processing program capable of appropriately using the head-related transfer function.

Solution to Problem

To solve the problem described above, an information processing apparatus includes: an executing unit that associates a head-related transfer function corresponding to a user with an identifier that identifies equipment that is used by the user; and a providing unit that provides the head-related transfer function and the identifier associated with the head-related transfer function to a providing destination to which the head-related transfer function corresponding to the user is provided.

Also, to solve the problem described above, an information processing apparatus includes: an acquiring unit that acquires a head-related transfer function corresponding to a user and an identifier associated with the head-related transfer function; a determination unit that determines a match between the identifier associated with the head-related transfer function and an identifier that identifies equipment that is used by the user; and a setting unit that sets, when the identifier associated with the head-related transfer function matches the identifier that identifies the equipment that is used by the user, the head-related transfer function so as to enable the head-related transfer function.

DESCRIPTION OF EMBODIMENTS

Figure 1:
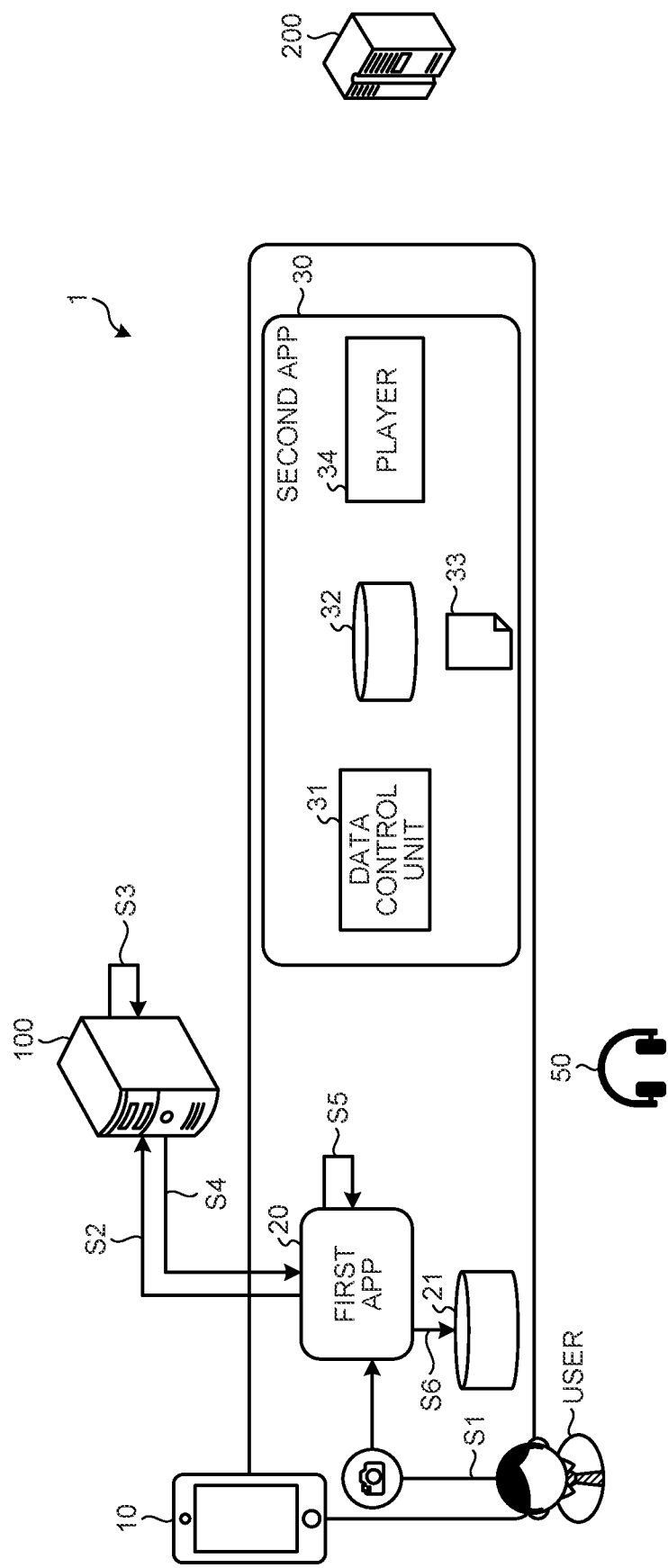
FIG. 1 is a diagram illustrating an information processing system according to an embodiment of the present disclosure.

Preferred embodiments of the present disclosure will be explained in detail below with reference to the accompanying drawings. Furthermore, in each of the embodiments, components having the same functions are assigned the same reference numerals and descriptions of overlapping portions will be omitted.

The present disclosure will be explained in the following order of items:
1. Embodiment
1-1. Example of configuration of information processing system and information processing according to the embodiment
1-2. Configuration of information processing apparatus according to the embodiment
1-3. Flow of information processing according to the embodiment
2. Modification example
2-1. Mode of information processing system
2-2. Playback mode of sound source
2-3. Use of parameter
2-4. Mode of equipment
3. Another embodiment
4. Effects of information processing apparatus according to the present disclosure
5. Hardware configuration

1. Embodiment

1-1. Example of Configuration of Information Processing System and Information Processing According to the Embodiment First, a configuration of an information processing system 1 according to the present disclosure and the outline of information processing performed by the information processing system 1 will be described with reference to FIG. 1 and FIG. 2.

FIG. 1 is a diagram illustrating the information processing system 1 according to the embodiment of the present disclosure. The information processing according to the embodiment of the present disclosure is implemented by the information processing system 1 illustrated in FIG. 1. As illustrated in FIG. 1, the information processing system 1 includes a user terminal 10, a pair of headphones 50, a cloud server 100, and a service server 200. Each of the devices included in the information processing system 1 performs two-way communication by using a wired or wireless network (not illustrated). Furthermore, the number of the devices constituting the information processing system 1 is not limited to that illustrated in the drawing.

The user terminal 10 is an example of the information processing apparatus according to the present disclosure and is an information processing terminal that performs information processing by using a head-related transfer function (hereinafter, sometimes referred to as a HRTF (head-related transfer function)). The user terminal 10 is implemented by, for example, a smartphone or the like having an image capturing function.

The pair of headphones 50 is an example of audio equipment used by a user. For example, the pair of headphones 50 has a communication function of Bluetooth (registered trademark) or the like and establishes wireless communication with the user terminal 10. Then, the pair of headphones 50 outputs voices or the like sent from the user terminal 10 in accordance with the operation performed by the user.

The cloud server 100 calculates a HRTF (head-related transfer function) corresponding to each of the users and provides the calculated HRTF to the user terminal 10. The cloud server 100 acquires an image of the ear of the user from the user terminal 10 via a network and calculates the HRTF of the user based on the acquired image.

The service server 200 is a server device that provides a sound source of music or the like to the user terminal 10. For example, the service server 200 provides a streaming sound source or the like to the user terminal 10 via the network in accordance with control performed by a music playback application or the like installed in the user terminal 10.

As described above, the user terminal 10 performs the information processing that uses the HRTF. The HRTF expresses a change in sound generated due to peripheral objects including the human auricle (concha), the shape of the head region, and the like as a transfer function. In general, measurement data for obtaining the HRTF is acquired by measuring a sound signal that is used for measurement by using a microphone a dummy head microphone, or the like worn on auricle by a person.

For example, the HRTF that is used for the technology of 3D sound or the like is often calculated by using measurement data acquired by the dummy head microphone or the like or by using an average value of the measurement data acquired from a great number of people. However, because the HRTF varies greatly between individuals, it is preferable to use the HRTF of the individual user in order to implement more effective acoustic stage effects. Namely, it is possible to provide an acoustic bodily sensation having more realistic sensations to the user by replacing a general HRTF with the user's own HRTF.

As an example of a method for calculating a personal HRTF of the user, there is a method for calculating a HRTF of the user from a captured image of the shape of the user's ear. For example, the cloud server 100 acquires an image including the shape of the user's ear captured by the user terminal 10 and calculates a personal HRTF of the user based on the acquired image. Then, the cloud server 100 sends the calculated HRTF to the user terminal 10. Consequently, the user terminal 10 can play back the sound of 3D sound reproduced by using the personal HRTF of the user and can play back a moving image having realistic sensations.

However, there are some problems in the method described above. For example, the user terminal 10 operates applications, such as an application (hereinafter, simply referred to as an "app") having a function for sending or managing a HRTF, an app for playing back music, an app for playing back a moving image, that are developed by various business operators. In this case, there may be a case in which the HRTF data is not able to be sent and received between the app that manages the HRTF and a music playback purpose app or the like due to, for example, Operating System (OS) constraints or the like.

Furthermore, even if the HRTF data can be sent and received, there may be a possibility that the operation thereof is not appropriately performed. For example, the HRTF can be calculated regardless of audio equipment (the pair of headphones 50, etc.) that is actually used by the user; however, in order to more effectively exert sound effects, it is preferable to use the HRTF data together with an output value in conformity to an impedance of the equipment or a variable (parameter) of the delay time or the like based on the shape or the like of the output unit of the equipment. However, when the user uses the music playback purpose app or the like, it is difficult for the cloud server 100 and the app that manages the HRTF to control the use of the music playback purpose app due to OS constraints. Thus, there may possibly be a case in which the HRTF is used in a mode that is not intended by the cloud server 100 and the app that manages the HRTF.

As described above, there are various problems regarding the HRTF when the HRTF is allowed to be flexibly used across a plurality of apps or when the HRTF is allowed to be appropriately used in accordance with the environment of the user or the status of the equipment. The user terminal 10 according to the embodiment solves the above described problems by information processing according to the present disclosure described below. In the following, the outline of the information processing according to the present disclosure will be described in line with the processes with reference to FIG. 1 and FIG. 2.

As illustrated in FIG. 1, a first app 20 and a second app 30 have already been installed in the user terminal 10. The first app 20 is an app provided from, for example, a business operator who manages the cloud server 100. The first app 20 has a function for capturing images including the ears of a user, sending the captured image to the cloud server 100, and managing the HRTFs sent from the cloud server 100.

In the information processing according to the embodiment, first, the first app 20 captures, in accordance with the operation performed by the user, an image including the ears of the user and acquires the image including the ears (Step S1). Subsequently, the first app 20 sends the image including the ear to the cloud server 100 (Step S2). Furthermore, as a pre-process of sending the image to the cloud server 100, the first app 20 may also perform a process of detecting a video image of the ears of the user included in the image and cutting out the region of the detected video image of the ears from the image.

The cloud server 100 acquires the image sent from the user terminal 10. Then, the cloud server 100 calculates the HRTF of the user from the image (Step S3). Various methods may also be used for the method for calculating the HRTF performed by the cloud server 100. For example, if a two-dimensional image of the ears including the video image is input, the cloud server 100 may also calculate the HRTF by using the model obtained by learning so as to output the HRTF associated with each of the ears. Alternatively, the cloud server 100 may also generate a 3D model of the head region of the user from the two-dimensional image of the ears including the video image and calculate the HRTF from the generated 3D model. In a description below, the HRTF calculated in accordance with the individual user is referred to as a personal HRTF and is sometimes distinguished from a general HRTF.

Furthermore, the cloud server 100 may also generate a BRIR (binaural room impulse response) by convolving a RIR (room impulse response) with the calculated personal HRTF. In a description below, the BRIR generated in accordance with the individual user is referred to as a personal BRIR and is sometimes distinguished from a general BRIR. Furthermore, the data that is used at the time of, for example, playback of music in the user terminal 10 is not sometimes, in practice, the HRTF but is the BRIR; however, in a description below, it is assumed that both may also be replaced with each other. For example, the description of "sending the generated BRIR" includes the situation of sending the calculated HRTF. Furthermore, it is assumed that the description of "performing a playback by using the BRIR" includes the situation of performing a playback by using the HRTF.

After that, the cloud server 100 sends the generated personal BRIR to the user terminal 10 (Step S4). The first app 20 acquires the personal BRIR (Step S5). In this way, the user can acquire the own personal BRIR by capturing the side face of the user and sending the image to the cloud server 100. Then, the first app 20 stores the received personal BRIR in a storage area 21 (Step S6).

Figure 2:
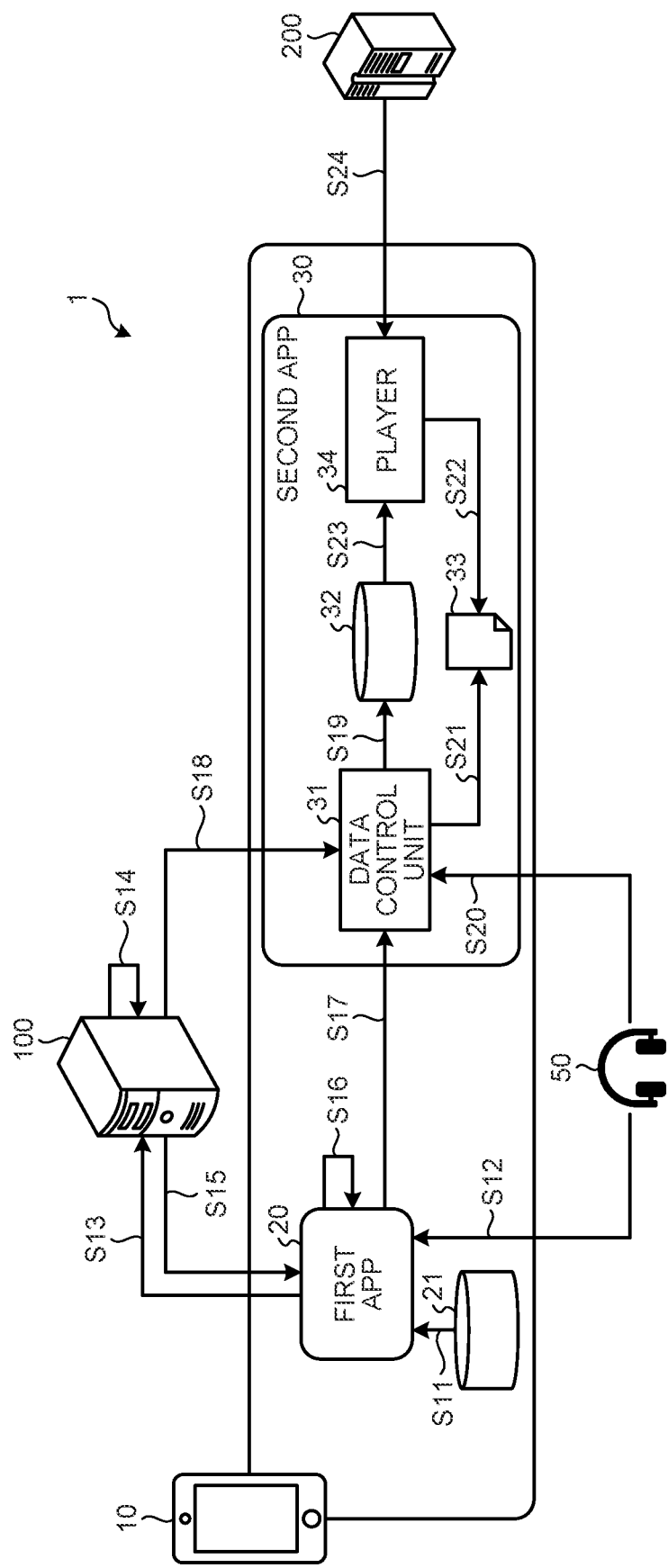
FIG. 2 is a conceptual diagram illustrating the overall flow of information processing according to the embodiment.

In the following, the flow of a process performed when the user terminal 10 plays back music or the like by using a personal BRIR will be described with reference to FIG. 2. FIG. 2 is a conceptual diagram illustrating the overall flow of the information processing according to the embodiment.

The first app 20 acquires the personal BRIR stored in the storage area 21 when, as a trigger, the user operates to activate the first app 20 (Step S11). Furthermore, the first app 20 recognizes the equipment connected to the user terminal 10. In the example illustrated in FIG. 2, the first app 20 recognizes the pair of headphones 50 in which communication has been established with the user terminal 10 by using a wireless connection, such as Bluetooth.

In this case, the first app 20 acquires information related to the pair of headphones 50 that is the connected equipment (Step S12). For example, the first app 20 acquires an identifier that identifies the equipment. When the equipment has, for example, a Bluetooth function, the identifier is a character string for identifying the equipment, such as a BT device name, or a unique character string for identifying individual equipment. Furthermore, the identifier may also be a model name or the like of the equipment that is uniquely given by a manufacturer.

Furthermore, the first app 20 may also acquire information indicating whether the connected equipment has a communication function. For example, if the equipment does not have a communication function, such as Bluetooth, there may be a case in which the equipment is not able to send information on the identifier or the like. In this case, the first app 20 acquires information on the mode indicating that the equipment connected to the user terminal 10 is not able to be recognized. This kind of information is distinguished by using information indicating, for example, whether the type of equipment is Active (having the communication function) or Passive (not having communication function). Namely, the first app 20 acquires information indicating whether the connected equipment is Active or Passive. In the example illustrated in FIG. 2, because the pair of headphones 50 has a communication function, the first app 20 acquires the information indicating that the pair of headphones 50 that is the connected equipment is "Active".

Then, the first app 20 associates the personal BRIR with the identifier of the pair of headphones 50 that is the equipment used by the user. The associating mentioned here indicates that, because the equipment connected to the user terminal 10 at the present moment is, for example, the pair of headphones 50, the second app 30, which will be described later, grants control information for controlling a playback in equipment other than the pair of headphones 50. More specifically, the associating mentioned here indicates that a variable (hereinafter, referred to as an "equipment optimization parameter") for optimizing certain equipment grants control information for controlling so as not to be erroneously used by the other equipment.

After that, the first app 20 sends (uploads) information related to the personal BRIR or the pair of headphones 50 to the cloud server 100 (Step S13). This process is performed in order to allow the personal BRIR to be delivered via the cloud server 100 because data is not able to be directly sent from the first app 20 to the second app 30.

The cloud server 100 acquires the information related to the personal BRIR and the pair of headphones 50. Then, the cloud server 100 specifies, based on the identifier of the pair of headphones 50, the equipment optimization parameter of the pair of headphones 50 from among the pieces of held information.

Furthermore, the cloud server 100 issues an acquisition purpose address of the personal BRIR in order for the first app to acquire the personal BRIR (Step S14). For example, the acquisition purpose address mentioned here is a one-time Uniform Resource Locator (one-time URL) for accessing the cloud server 100 and acquiring the personal BRIR. In this way, the cloud server 100 delivers the personal BRIR via the acquisition purpose address. Consequently, even in the situation in which the personal BRIR is not able to be delivered from the first app 20 to the playback purpose app (the second app 30 in the example illustrated in FIG. 2) due to OS constraints, the user terminal 10 can deliver the personal BRIR to the second app 30.

Furthermore, the cloud server 100 also issues a one-time URL that is the acquisition purpose address of the equipment optimization parameter of the pair of headphones 50.

Then, the cloud server 100 sends, to the first app 20, the issued acquisition purpose address of the personal BRIR and the acquisition purpose address of the equipment optimization parameter of the pair of headphones 50 (Step S15).

The first app 20 acquires the acquisition purpose address of the personal BRIR and acquisition purpose address of the equipment optimization parameter of the pair of headphones 50 sent from the cloud server 100 (Step S16). Furthermore, the first app 20 may also associate the personal BRIR with the identifier of the pair of headphones 50 at the timing at Step S16.

After that, the first app 20 provides the acquired information to the second app 30 when, as a trigger, for example, the second app 30 is activated by the operation performed by the user (Step S17). Specifically, the first app 20 provides the acquisition purpose address of the personal BRIR, the acquisition purpose address of the equipment optimization parameter of the pair of headphones 50, the identifier of the pair of headphones 50, the model name of the pair of headphones 50, the information on the type of the equipment, and the like to the second app 30.

The second app 30 is an app for playing back the sound source or a moving image. For example, the second app 30 is provided to the user from the business operator or the like who is the same business operator who manages the service server 200 that provides a streaming sound source. Furthermore, as will be described later, the second app 30 may also include processing units, such as a data control unit 31 and a player 34, and the data control unit 31 may also be provided, as a shared library, from the business operator who provides the first app 20. Namely, the business operator who manages the service server 200 may also provide only the function corresponding to the player 34 included in the second app 30.

The data control unit 31 included in the second app 30 is a library including an executable file for sending and receiving data to and from, for example, the first app 20 or the cloud server 100 and is sometimes called a server access library (SAL) or the like.

The data control unit 31 acquires the personal BRIR from the cloud server 100 via the acquisition purpose address of the personal BRIR provided from the first app 20 (Step S18). Furthermore, the data control unit 31 acquires the equipment optimization parameter of the pair of headphones 50 from the cloud server 100 via the acquisition purpose address of the equipment optimization parameter provided from the first app 20.

The data control unit 31 stores the acquired personal BRIR and the equipment optimization parameter of the pair of headphones 50 in a storage area 32 (Step S19).

Subsequently, the data control unit 31 recognizes the equipment connected to the user terminal 10. Specifically, the data control unit 31 recognizes the pair of headphones 50 in which communication with the user terminal 10 has been established (Step S20).

Then, the data control unit 31 determines a match between the identifier of the equipment associated with the personal BRIR by the first app 20 and the identifier that identifies the equipment to be used by the user at the present moment. Specifically, the data control unit 31 determines a match between the identifier of the equipment associated with the HRTF by the first app 20 at Step S12 and the identifier of the equipment that is connected at the time point at Step S20. In the example illustrated in FIG. 2, because both of the identifiers of these pieces of equipment indicate the pair of headphones 50, the data control unit 31 determines that both have been matched.

In this case, the data control unit 31 updates a setting file (Config File) 33 in which the setting at the time of playback performed by the second app 30 is held. Specifically, the data control unit 31 writes the acquired personal BRIR and information indicating that the equipment optimization parameter is used (enabled) in a playback process into the setting file 33.

In contrast, if the identifier of the equipment associated with the personal BRIR by the first app 20 does not match the identifier that identifies the equipment to be used by the user at the present moment, the data control unit 31 writes information indicating not to enable the acquired personal BRIR and the equipment optimization parameter.

Namely, the data control unit 31 compares the identifier (BT device name, etc.) delivered from the first app 20 with the identifier of the pair of headphones 50 that is being connected at the present moment and decides the personal BRIR and the equipment optimization parameter that are used for playing back the sound source. Then, the data control unit 31 updates the setting file 33 in accordance with the decided content (Step S21).

In this way, if the equipment (the pair of headphones 50) that is actually used is changed even in the case of personal BRIR and the equipment optimization parameter that have been provided from the cloud server 100, the data control unit 31 restricts the use thereof. Namely, by including a step of determining the identifier of the equipment in the second app 30 that actually performs a playback, the data control unit 31 can prevent an inappropriate playback from being performed, at the time of playing back music, due to the use of an equipment optimization parameter of different equipment.

After that, when the user desires to play back the music, the second app 30 performs the function of the player 34. The player 34 is a processing unit that plays back music or a moving image based on the sound source of the music file or the like and based on the information that is set in the setting file 33.

The player 34 reads the setting file 33 and recognizes that the personal BRIR is used for a playback or the equipment optimization parameter of the pair of headphones 50 is used (Step S22).

Subsequently, the player 34 acquires, based on the information that is set in the setting file 33, the personal BRIR and the equipment optimization parameter from the storage area 32 (Step S23).

Furthermore, the player 34 access the service server 200 that provides a streaming sound source or the like and acquires the sound source (Step S24).

Then, the player 34 plays back the sound source by convolving the personal BRIR and the equipment optimization parameter with the sound source. Consequently, the player 34 can perform a playback that uses the transfer function in conformity to the shape of the ear of the individual user and that uses the parameter optimized for a playback environment of the pair of headphones 50 or the like.

As described above, the user terminal 10 that is an example of the information processing apparatus according to the present disclosure associates the personal BRIR (or the personal HRTF) corresponding to the user with the identifier that identifies the equipment used by the user. Then, the user terminal 10 provides the personal BRIR and the identifier associated with the personal BRIR to the second app 30 that is the providing destination to which the personal BRIR corresponding to the user is provided.

Namely, the user terminal 10 provides not only the personal BRIR but also the identifier of the equipment that is connected in the environment in which the personal BRIR is used. In this way, the user terminal 10 can perform a playback that is optimized for the environment of the user by also providing information indicating what kind of equipment is going to be used for the personal BRIR by the user to a playback environment (the second app 30, etc.).

Furthermore, the user terminal 10 acquires the personal BRIR corresponding to the user and the identifier associated with the personal BRIR and determines a match between the identifier associated with the personal BRIR and the identifier that identifies the equipment used by the user. Then, when the identifier associated with the personal BRIR matches the identifier that identifies the equipment used by the user, the user terminal 10 sets the personal BRIR to enable the personal BRIR.

In this way, by recognizing the equipment that is connected at the present moment in the environment in which the personal BRIR is going to be used, the user terminal 10 determines whether the personal BRIR and the equipment optimization parameter provided from the cloud server 100 are to be used. Consequently, the user terminal 10 can prevent an inappropriate personal BRIR from being used at the time of playback or prevent an erroneous use of a different equipment optimization parameter. As a result, the user terminal 10 can perform a playback optimized for the environment of the user.

As described above, a description has been given of the outline of the overall flow of the information processing according to the present disclosure. In a description below with reference to FIG. 3 and the subsequent drawings, a configuration of the user terminal 10 and various processes will be described in detail.

Figure 3:
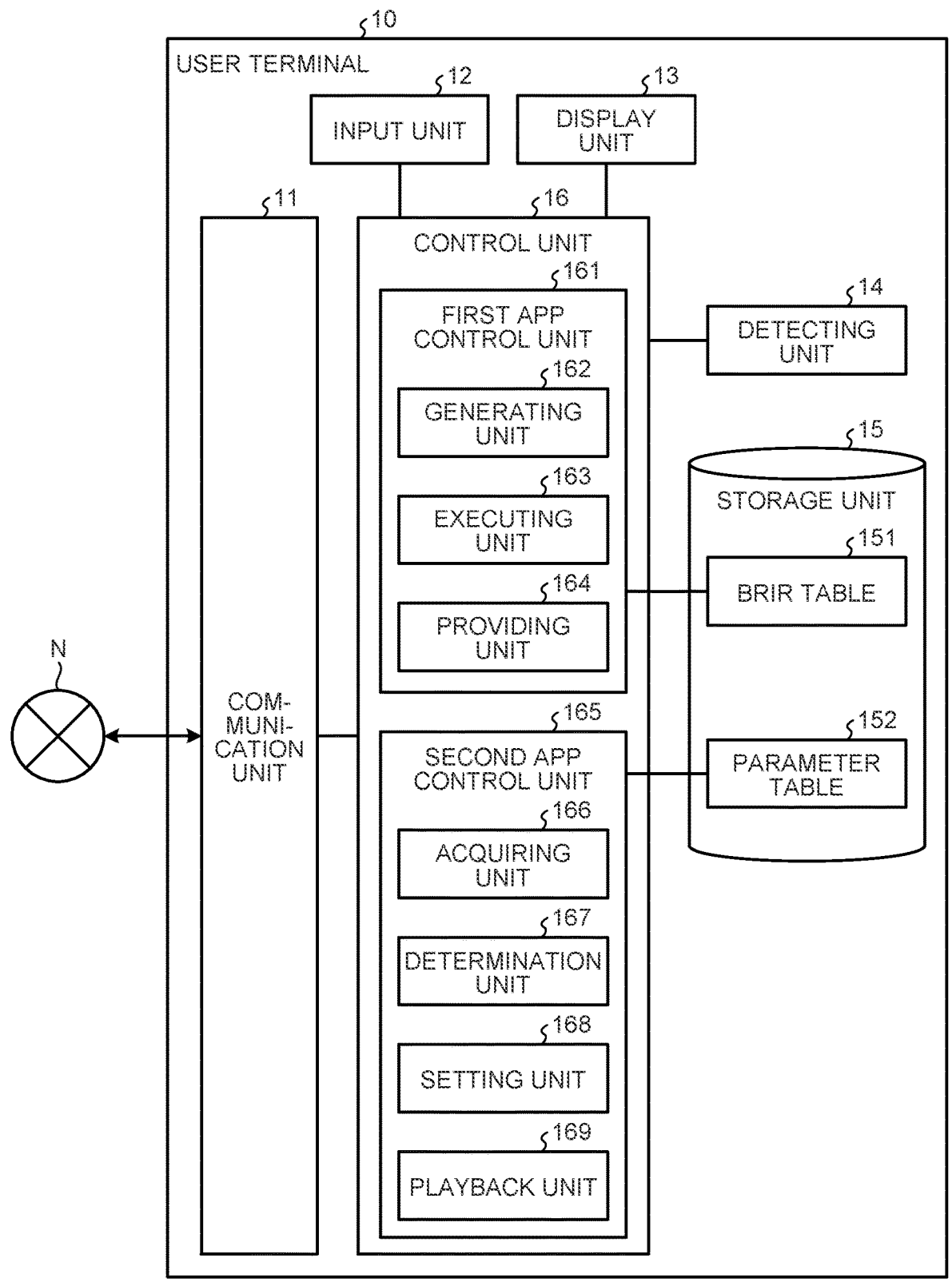
FIG. 3 is a diagram illustrating a configuration example of a user terminal according to the embodiment.

1-2. Configuration of Information Processing Apparatus According to the Embodiment A configuration of the user terminal 10 that is an example of the information processing apparatus according to the present disclosure will be described with reference to FIG. 3. FIG. 3 is a diagram illustrating a configuration example of the user terminal 10 according to the embodiment of the present disclosure. As illustrated in FIG. 3, the user terminal 10 includes a communication unit 11, an input unit 12, a display unit 13, a detecting unit 14, a storage unit 15, and a control unit 16.

The communication unit 11 is implemented by, for example, a Network Interface Card (NIC) or the like. The communication unit 11 is connected by a network N (the Internet, etc.) in a wired or wireless manner, and sends and receives, via the network N, information to and from the cloud server 100, the service server 200, the pair of headphones 50, or the like.

The input unit 12 is an input device that receives various operations from a user. For example, the input unit 12 is implemented by an operation key or the like included in the user terminal 10. The display unit 13 is a display device for displaying various kinds of information. For example, the display unit 13 is implemented by a liquid crystal display or the like. Furthermore, if a touch panel is used for the user terminal 10, a part of the input unit 12 is integrated with the display unit 13.

The detecting unit 14 is a general term of various sensors and detects various kinds of information related to the user terminal 10. Specifically, the detecting unit 14 detects an operation performed by the user with respect to the user terminal 10, location information on the location of the user terminal 10, information related to the equipment connected to the user terminal 10, an environment of the user terminal 10, and the like.

Furthermore, the detecting unit 14 includes, as an example of the sensor, a lens and an image sensor for capturing an image. Namely, the detecting unit 14 exhibits a function as a camera when, for example, a user activates an app for operating an image capturing function.

The storage unit 15 is implemented by, for example, a semiconductor memory device, such as a random access memory (RAM) and a flash memory, or a storage device, such as a hard disk or an optical disk. The storage unit 15 stores therein various kinds of data that is used for the information processing.

As illustrated in FIG. 3, the storage unit 15 includes data tables, such as a BRIR table 151 and a parameter table 152. The BRIR table 151 is associated with, for example, the storage area 21 illustrated in FIG. 2. The parameter table 152 is associated with, for example, the storage area 32 illustrated in FIG. 2.

Figure 4:
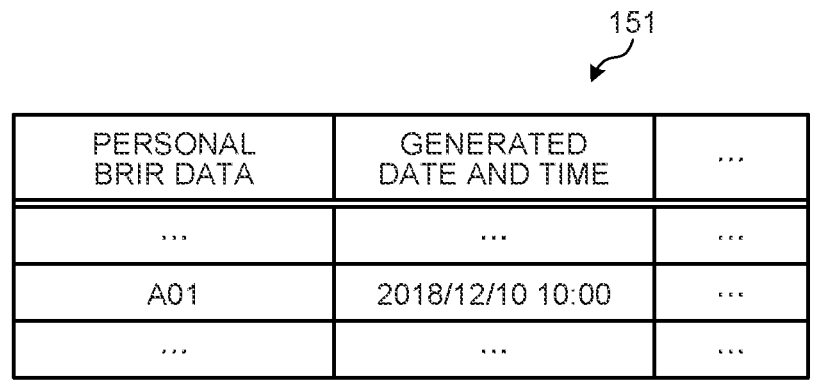
FIG. 4 is a diagram illustrating an example of a BRIR table according to the embodiment.

A BRIR table 121 stores therein information related to the personal BRIR generated by the cloud server 100. FIG. 4 illustrates an example of the BRIR table 151 according to the embodiment of the present disclosure. FIG. 4 is a diagram illustrating an example of the BRIR table 151 according to the embodiment. In the example illustrated in FIG. 4, the BRIR table 151 has items, such as "personal BRIR data", "generated date and time", and the like.

The "personal BRIR data" indicates the data of the personal BRIR generated by the cloud server 100. FIG. 4 conceptually illustrates the personal BRIR data as "A01"; however, in practice, in the subject item, a specific numerical value or the like that indicates the personal BRIR is stored.

The "generated date and time" indicates the date and time in which the personal BRIR data is generated. When the user terminal 10 acquires the personal BRIRs more than once, the user terminal 10 may also hold only the latest personal BRIR in the BRIR table 151 or may also hold a plurality of personal BRIRs in the BRIR table 151.

Figure 5:
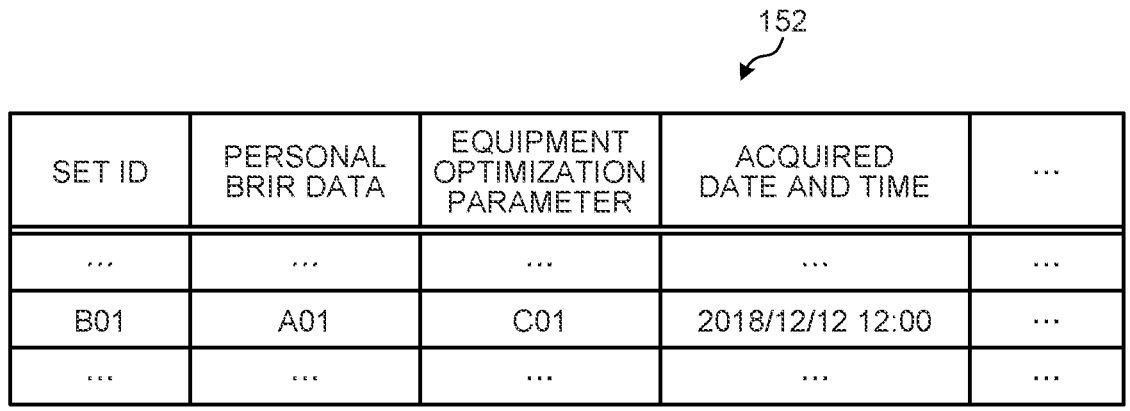
FIG. 5 is a diagram illustrating an example of a parameter table according to the embodiment.

In the following, a parameter table 122 will be described. The parameter table 122 stores therein information related to the parameter of the sound source or the moving image used at the time of playback. FIG. 5 illustrates an example of the parameter table 152 according to the embodiment of the present disclosure. FIG. 5 is a diagram illustrating an example of the parameter table 152 according to embodiment. In the example illustrated in FIG. 5, the parameter table 152 has items, such as "set ID", "personal BRIR data", "equipment optimization parameter", "acquisition date and time", and the like.

The "set ID" indicates identification information for identifying a setup indicating that the personal BRIR has been associated with the equipment optimization parameter. The "personal BRIR data" is associated with the same item illustrated in FIG. 4. The "equipment optimization parameter" indicates data of the equipment optimization parameter acquired from the cloud server 100. FIG. 5 conceptually illustrates the equipment optimization parameter as "C01"; however, in practice, in the subject item, a specific numerical value or the like that indicates the equipment optimization parameter is stored.

The "acquisition date and time" indicates the date and time in which the personal BRIR and the equipment optimization parameter are acquired from the cloud server 100. When the user terminal 10 acquires the personal BRIRs and the equipment optimization parameters more than once, the user terminal 10 may also hold the latest personal BRIR and the equipment optimization parameter in the parameter table 152 or may also hold a plurality of personal BRIRs and equipment optimization parameters in the BRIR table 151.

A description will be continued by referring back to FIG. 3. The control unit 16 is implemented by, for example, a central processing unit (CPU), a micro processing unit (MPU), a graphics processing unit (GPU), or the like executing, in a random access memory (RAM) or the like as a work area, the program (for example, an information processing program according to the present disclosure) that is stored in the user terminal 10. Furthermore, the control unit 16 is a controller and may also be implemented by, for example, an integrated circuit, such as an application specific integrated circuit (ASIC), a field programmable gate array (FPGA), or the like.

As illustrated in FIG. 3, the control unit 16 includes a first app control unit 161 and a second app control unit 165 and implements or executes the function or an operation of the information processing described below. The first app control unit 161 includes a generating unit 162, an executing unit 163, and a providing unit 164. The second app control unit 165 includes an acquiring unit 166, a determination unit 167, a setting unit 168, and a playback unit 169. For example, the acquiring unit 166, the determination unit 167, and the setting unit 168 are associated with the data control unit 31 illustrated in FIG. 2. Furthermore, the playback unit 169 is associated with the player 34 illustrated in FIG. 2. Furthermore, the internal configuration of the control unit 16 is not limited to the configuration illustrated in FIG. 3 and another configuration may also be used as long as the configuration is set up so as to perform the information processing, which will be described later.

The generating unit 162 controls the process related to generating a HRTF and a personal BRIR. Specifically, the generating unit 162 controls the process related to capturing an image of the side face including the ear of the user. Furthermore, the generating unit 162 controls a process of sending the image obtained by capturing the image to the cloud server 100 or a process of acquiring the personal BRIR generated by the cloud server 100.

The generating unit 162 appropriately stores the captured image or the acquired personal BRIR in the storage unit 15. Furthermore, instead of sending the image captured by the user terminal 10 to the cloud server 100, the generating unit 162 may also acquire the image captured by, for example, an external camera or the like and may also send the acquired image to the cloud server 100.

Furthermore, if the personal HRTF or the personal BRIR that has already been generated for the user is held in the cloud server 100, the generating unit 162 may also control only the process of acquiring the personal HRTF or the personal BRIR instead of sending the image to the cloud server 100. Namely, the process of acquiring the personal HRTF or the personal BRIR performed by the generating unit 162 is not limited to a specific method.

The executing unit 163 associates the personal HRTF or the personal BRIR corresponding to the user with the identifier that identifies the equipment used by the user.

For example, the executing unit 163 acquires the personal BRIR stored in the BRIR table 151 when, as a trigger, the user activates the first app. Furthermore, the executing unit 163 acquires, from the pair of headphones 50, the identifier that identifies the pair of headphones 50 connected at the time point in which the first app is activated. Then, the executing unit 163 associates the personal BRIR with the identifier of the pair of headphones 50 and uploads the personal BRIR together with the associated information to the cloud server 100.

After that, the executing unit 163 acquires the acquisition purpose one-time URL of the personal BRIR and the pair of headphones 50 issued by the cloud server 100. Furthermore, the executing unit 163 may also associate the personal BRIR with the identifier of the pair of headphones 50 at the time point in which the acquisition purpose one-time URL is acquired.

The providing unit 164 provides the personal BRIR and the identifier associated with the personal BRIR to the providing destination to which the personal BRIR corresponding to the user is provided. The providing destination mentioned here is an app (the second app in the embodiment) that is, for example, installed in the user terminal 10 and that is different from the first app. Furthermore, the providing destination is not limited to the second app but may also be another piece of external equipment (for example, another information processing terminal capable of performing tow-way communication with the user terminal 10) or the like.

The providing unit 164 provides the personal BRIR to the providing destination by sending, to the providing destination, the one-time URL that is used by the providing destination to acquire the personal BRIR. In other words, the providing unit 164 provides the personal BRIR to the providing destination via the one-time URL. Consequently, the providing unit 164 can also provide the personal BRIR to the second app that is not able to directly perform delivery due to, for example, OS constraints or the like.

Furthermore, the providing unit 164 may also provide, to the providing destination together with the identifier, a variable (equipment optimization parameter) in accordance with the equipment that is used together with the personal BRIR.

The providing unit 164 provides the equipment optimization parameter to the providing destination by sending, to the providing destination, the one-time URL that is used by the providing destination to acquire the equipment optimization parameter. Namely, similarly to the personal BRIR, the providing unit 164 provides the equipment optimization parameter to the providing destination via the one-time URL. Consequently, the providing unit 164 can also provide the equipment optimization parameter to the second app that is not able to directly perform delivery due to, for example, the OS constraints.

Furthermore, the providing unit 164 may also provide the equipment optimization parameter to the providing destination in a case in which the communication among the user terminal 10, the information processing apparatus, and the pair of headphones 50 has been established. Namely, if the communication with the pair of headphones 50 is disconnected at the timing at which, for example, the equipment optimization parameter is provided to the second app, the providing unit 164 does not need to provide the equipment optimization parameter to the second app. Consequently, the providing unit 164 can prevent inconsistency from arising between the equipment that is to be used by the user and the delivered optimization parameter.

The acquiring unit 166 acquires the personal BRIR corresponding to the user and the identifier associated with the personal BRIR.

For example, the acquiring unit 166 acquires the personal BRIR from the cloud server 100 via the one-time URL provided from the providing unit 164. Specifically, the acquiring unit 166 acquires the personal BRIR by accessing the access destination indicated by the one-time URL and sending an acquisition request for the personal BRIR with respect to the cloud server 100.

Furthermore, the acquiring unit 166 may also acquire, together with the identifier of the equipment, the equipment optimization parameter in accordance with the equipment at the time of being used together with the personal BRIR.

For example, the acquiring unit 166 acquires the equipment optimization parameter from the cloud server 100 via the one-time URL provided from the providing unit 164. Specifically, the acquiring unit 166 acquires the equipment optimization parameter by accessing the access destination indicated by the one-time URL and sending an acquisition request for the equipment optimization parameter with respect to the cloud server 100.

The acquiring unit 166 appropriately stores the acquired information in the storage unit 15. For example, the acquiring unit 166 associates the acquired personal BRIR and the equipment optimization parameter and stores the associated information in the parameter table 152.

The determination unit 167 determines a match between the identifier associated with the personal BRIR and the identifier that identifies the equipment used by the user.

Specifically, the determination unit 167 determines a match between the identifier of the BT device name or the like that is provided from the providing unit 164 and that is associated with the personal BRIR and the identifier of the BT device name or the like of the equipment that is used by the user at the present moment.

Furthermore, the determination unit 167 determines that the equipment in which communication with the user terminal 10 has been established is the equipment that is used by the user. For example, the determination unit 167 can specify the equipment in which communication with the user terminal 10 has been established by using the function (library, etc.) of the OS and detecting the equipment connected to the user terminal 10.

Furthermore, if the determination unit 167 is not able to detect the equipment that is being used by the user at the present moment or is not able to acquire the identifier of the equipment, it may also possible to be determined that the identifier associated with the personal BRIR does not match the identifier that identifies the equipment used by the user. For example, if the equipment that is used by the user at the present moment is Passive and does not have a function for sending the identifier, the determination unit 167 determines that the identifier associated with the personal BRIR does not match the identifier of the equipment.

If the identifier associated with the personal BRIR matches the identifier that identifies the equipment that is used by the user, the setting unit 168 sets the personal BRIR so as to enable the personal BRIR. Furthermore, the equipment used by the user mentioned here indicates the equipment in which communication with the user terminal 10 has been established at the timing in which the personal BRIR is going to be used, such as the timing in which the sound source is played back.

For example, if the identifier associated with the personal BRIR matches the identifier that identifies the equipment used by the user, the setting unit 168 writes information indicating that the personal BRIR acquired from the cloud server 100 is available into the setting file. Consequently, the playback unit 169, which will be described later, can perform a playback that uses the personal BRIR stored in the parameter table 152.

Furthermore, if the identifier associated with the personal BRIR does not match the identifier that identifies the equipment used by the user, the setting unit 168 may also set the personal BRIR or the equipment optimization parameter so as not to enable the personal BRIR or the equipment optimization parameter.

Consequently, the setting unit 168 can prevent the occurrence of a situation of failing to having a user experience, such as a situation in which, in an unclear environment of a playback status, an optimum sound source is not played back due to an erroneous use of the personal BRIR or the equipment optimization parameter.

Furthermore, the setting unit 168 may also sets the personal BRIR and the equipment optimization parameter so as not to enable both of the personal BRIR and the equipment optimization parameter, or may also set the personal BRIR so as to enable the personal BRIR and set the equipment optimization parameter so as not to enable the equipment optimization parameter. When the setting unit 168 sets the personal BRIR so as not to enable the personal BRIR, the setting unit 168 writes, to the setting file when the sound source is played back, data indicating to use an average BRIR obtained by averaging a plurality of users instead of using the personal BRIR. Furthermore, when the setting unit 168 sets the equipment optimization parameter so as not to enable the equipment optimization parameter, the setting unit 168 writes, to the setting file when the sound source is played back, data indicating to use the standard parameter that is commonly used by all of the equipments instead of using the equipment optimization parameter.

The playback unit 169 plays back a sound source or a moving image. At the time of playback, the playback unit 169 reads the setting file and specifies the BRIR and the parameter that is used for the playback. Then, the playback unit 169 acquires the personal BRIR and the equipment optimization parameter written to the setting file from the parameter table 152 and performs a playback.

For example, the playback unit 169 accesses the service server 200, acquires the streaming data, and plays back the acquired streaming data. Furthermore, the playback unit 169 may also play back not only the streaming data but also the sound source or the moving image stored in the storage unit 15.

1-3. Flow of the Information Processing According to the Embodiment

Figure 6:
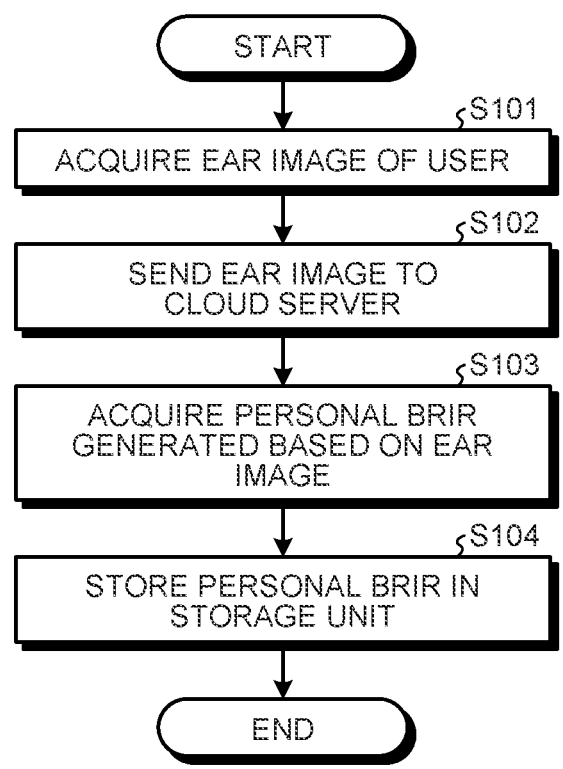
FIG. 6 is a flowchart (1) illustrating the flow of the information processing according to the embodiment.

In the following, the flow of the information processing according to the first embodiment will be described with reference to FIG. 6 to FIG. 9. In FIG. 6, the flow of the processes up to the step of acquiring the personal BRIR performed by the user terminal 10 will be described. FIG. 6 is a flowchart (1) illustrating the flow of the information processing according to the embodiment.

As illustrated in FIG. 6, the user terminal 10 acquires an ear image of the user via an image capturing process or the like (Step S101). Subsequently, the user terminal 10 sends the ear image to the cloud server 100 (Step S102).

After that, the user terminal 10 acquires the personal BRIR generated based on the ear image (Step S103). Then, the user terminal 10 stores the acquired personal BRIR in the storage unit 15 (the BRIR table 151) (Step S104).

Figure 7:
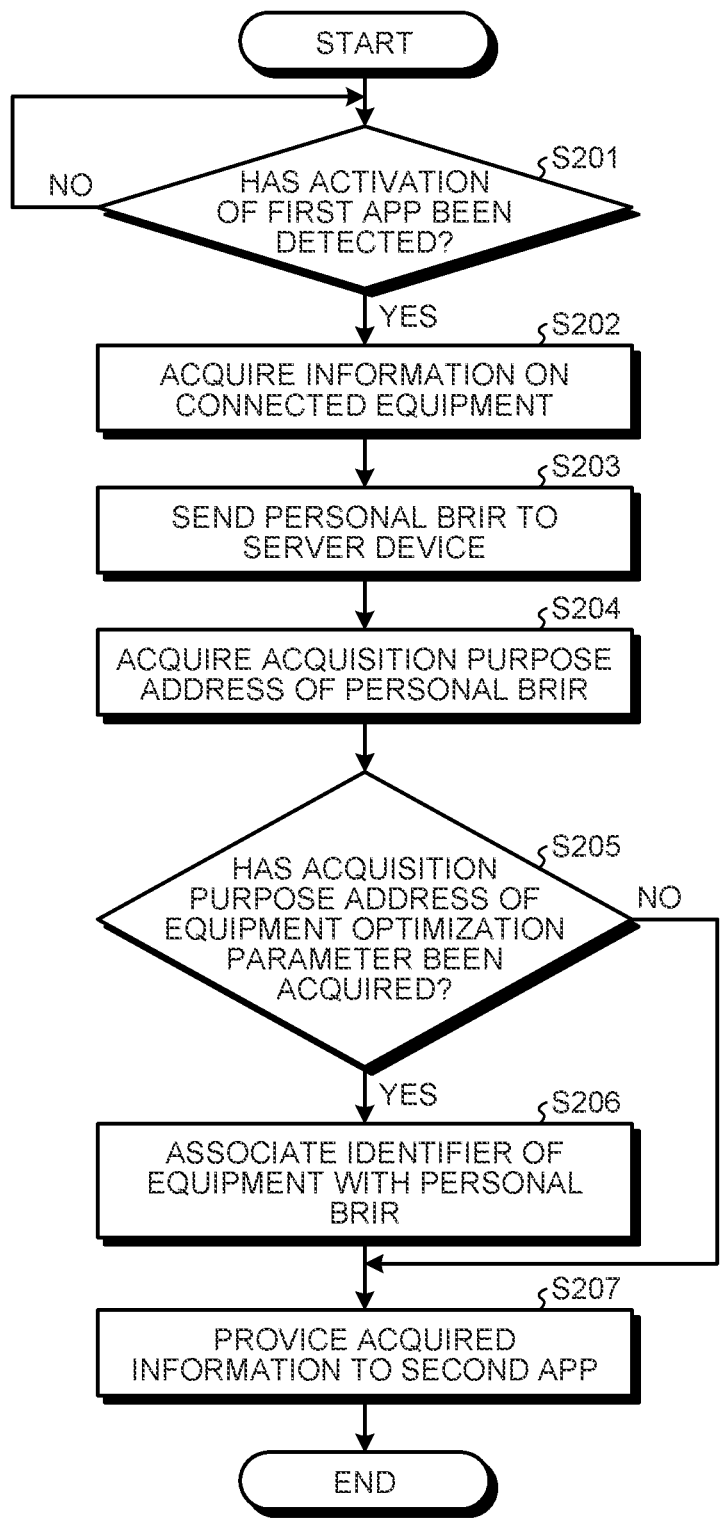
FIG. 7 is a flowchart (2) illustrating the flow of the information processing according to the embodiment.

In the following, the flow of the process in which the user terminal 10 provides the personal BRIR to the second app will be described with reference to FIG. 7. FIG. 7 is a flowchart (2) illustrating the flow of the information processing according to the embodiment.

As illustrated in FIG. 7, the user terminal 10 determines whether activation of the first app has been detected (Step S201). If activation of the first app has not been detected (No at Step S201), the user terminal 10 waits until activation is detected.

In contrast, if activation of the first app has been detected (Yes at Step S201), the user terminal 10 acquires information (for example, the identifier or the like of the pair of headphones 50) on the equipment connected to the user terminal 10 (Step S202).

After that, the user terminal 10 sends the personal BRIR stored in the BRIR table 151 to the cloud server 100 (Step S203). Subsequently, the user terminal 10 acquires the acquisition purpose address of the personal BRIR issued by the cloud server 100 (Step S204).

Furthermore, the user terminal 10 determines whether the acquisition purpose address of the equipment optimization parameter has been acquired (Step S205). If the acquisition purpose address of the equipment optimization parameter has been acquired (Yes at Step S205), the user terminal 10 associates the identifier of the equipment with the personal BRIR (Step S206).

In contrast, if the acquisition purpose address of the equipment optimization parameter has not been acquired (No at Step S205), the user terminal 10 does not need to associate the identifier of the equipment with the personal BRIR. The case of not acquiring the acquisition purpose address of the equipment optimization parameter mentioned here is a case in which, for example, the equipment is Passive and thus the identifier is not able to be acquired at Step S202, a case in which the cloud server 100 does not hold an optimization parameter of the equipment, or the like.

Then, the user terminal 10 provides information, such as the acquisition purpose address acquired from the cloud server 100, to the second app (Step S207).

Figure 8:
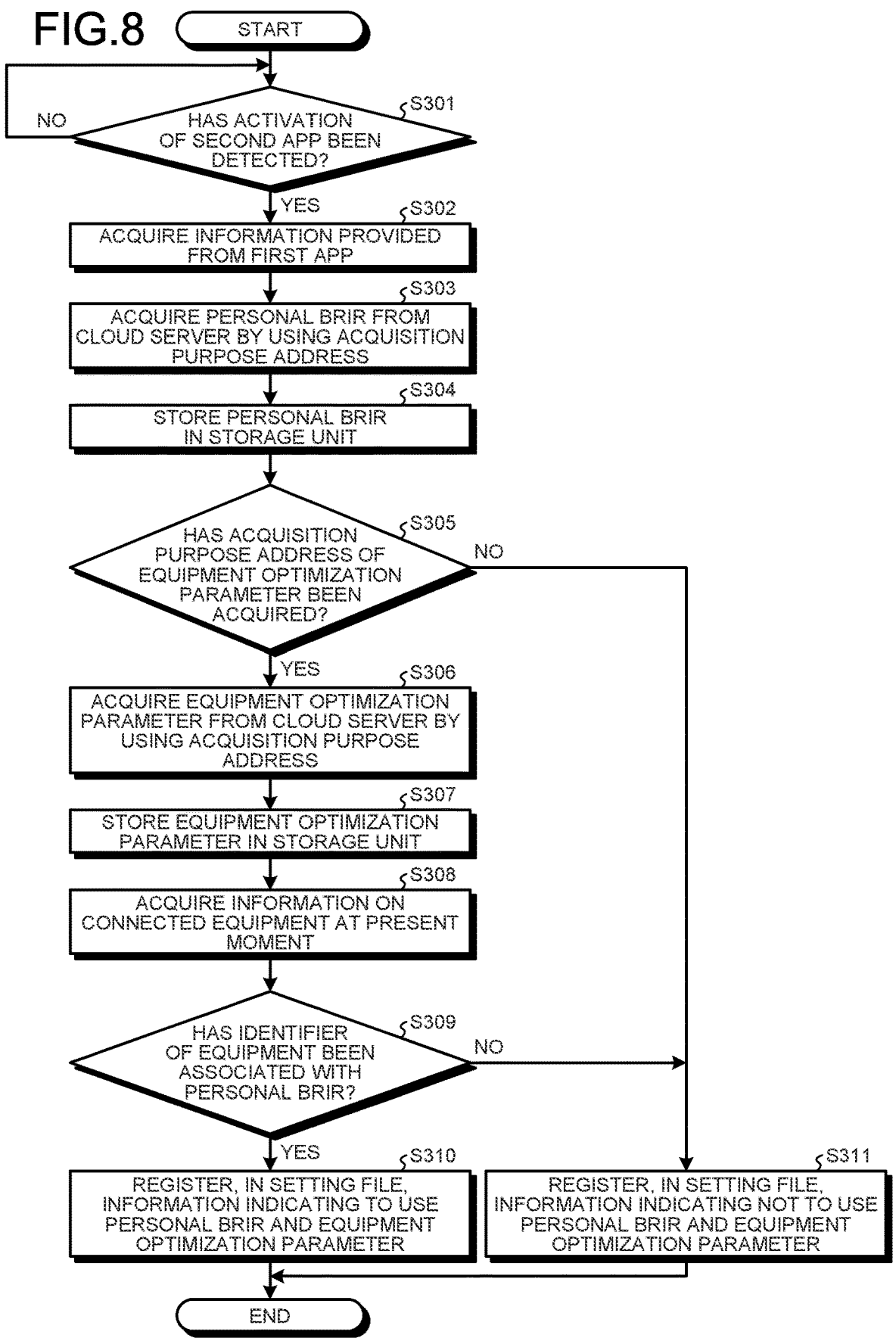
FIG. 8 is a flowchart (3) illustrating the flow of the information processing according to the embodiment.

In the following, the flow of the process in which the user terminal 10 sets the personal BRIR will be described with reference to FIG. 8. FIG. 8 is a flowchart (3) illustrating the flow of the information processing according to the embodiment.

As illustrated in FIG. 8, the user terminal 10 determines whether activation of the second app has been detected (Step S301). If activation of the second app has not been detected (No at Step S301), the user terminal 10 waits until activation is detected.

In contrast, if activation of the second app has been detected (Yes at Step S301), the user terminal 10 acquires the information provided from the first app (Step S302).

After that, the user terminal 10 acquires the personal BRIR from the cloud server 100 by using the provided acquisition purpose address (Step S303). Subsequently, the user terminal 10 stores the acquired personal BRIR in the storage unit 15 (the parameter table 152) (Step S304).

Furthermore, the user terminal 10 determines whether the acquisition purpose address of the equipment optimization parameter has been acquired from the first app (Step S305). If the acquisition purpose address of the equipment optimization parameter has been acquired (Yes at Step S305), the user terminal 10 acquires the equipment optimization parameter from the cloud server 100 by using the acquisition purpose address (Step S306). The user terminal 10 associates the acquired equipment optimization parameter with the personal BRIR and stores the parameter in the storage unit 15 (the parameter table 152) (Step S307).

Furthermore, the user terminal 10 acquires information on the equipment that is connected at the present moment (Step S308). Then, the user terminal 10 determines whether the identifier of the equipment acquired at Step S308 matches the identifier associated with the personal BRIR (Step S309).

If the identifier of the equipment acquired at Step S308 matches the identifier associated with the personal BRIR (Yes at Step S309), the user terminal 10 registers information into the setting file indicating to use the personal BRIR and the equipment optimization parameter. In other words, the user terminal 10 enables the personal BRIR and the equipment optimization parameter (Step S310).

In contrast, if the user terminal 10 does not acquire the acquisition purpose address of the equipment optimization parameter from the first app (No at Step S305), or if the identifier of the equipment acquired at Step S308 does not match the identifier associated with the personal BRIR (No at Step S309), the user terminal 10 registers in the setting file indicating not to use the personal BRIR and the equipment optimization parameter. In other words, the user terminal 10 sets the personal BRIR and the equipment optimization parameter so as not to enable the personal BRIR and the equipment optimization parameter (Step S311).

Furthermore, instead of setting the personal BRIR and the equipment optimization parameter so as not to enable the personal BRIR and the equipment optimization parameter, the user terminal 10 may also set, at Step S311, the personal BRIR and the equipment optimization parameter so as not to enable only the equipment optimization parameter. For example, if the equipment is Passive or the like, the user terminal 10 may also allow the user to use only the personal BRIR.

Figure 9:
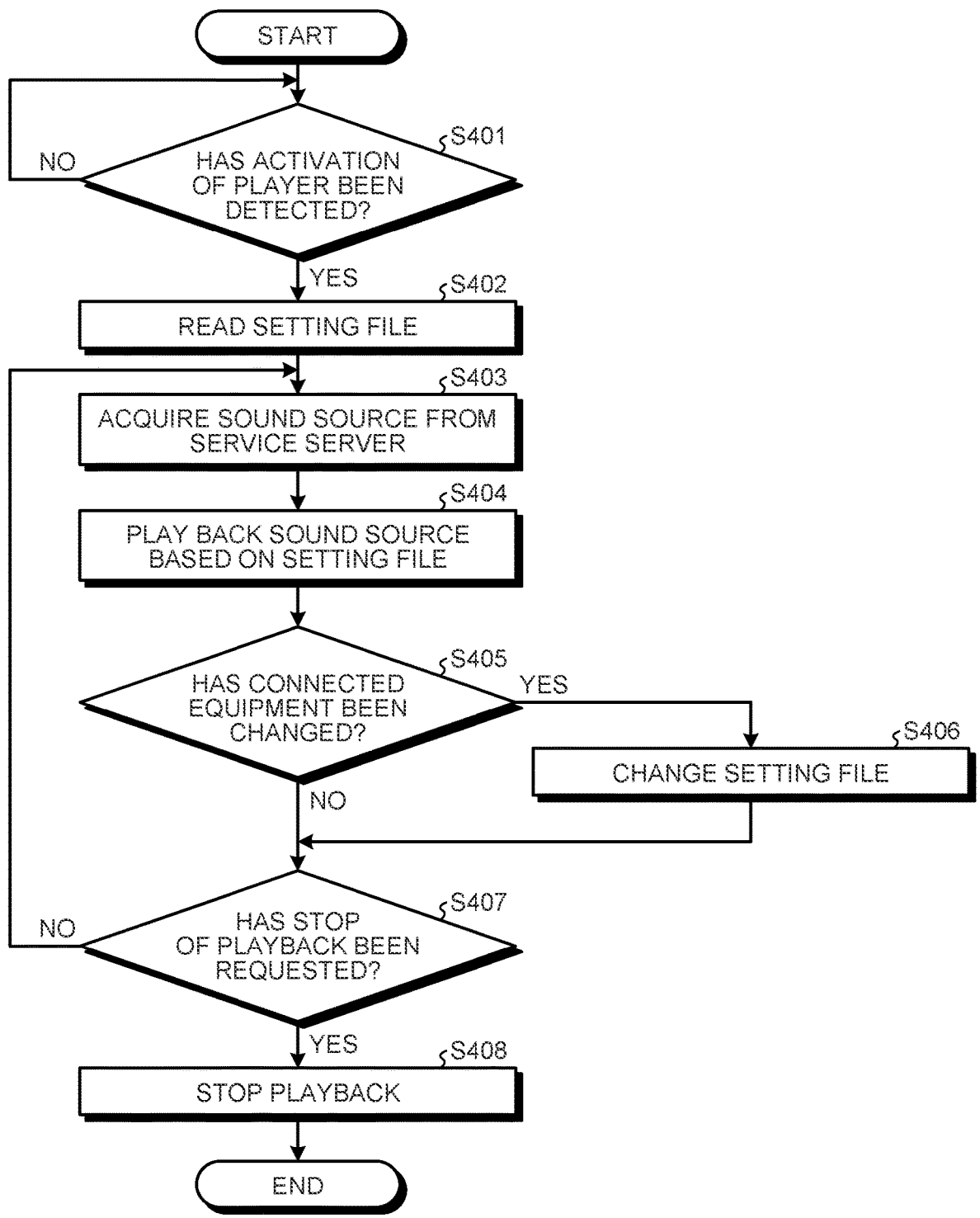
FIG. 9 is a flowchart (4) illustrating the flow of the information processing according to the embodiment.

In the following, the flow of the process in which the user terminal 10 performs a playback by using the personal BRIR will be described with reference to FIG. 9. FIG. 9 is a flowchart (4) illustrating the flow of the information processing according to the embodiment.

The user terminal 10 determines whether activation of the player included in the second app has been detected (Step S401). Furthermore, activation of the player mentioned here may also be read as a state in which, for example, the user operates the second app to play back the sound source.

If activation of the player has not been detected (No at Step S401), the user terminal 10 waits until activation is detected. In contrast, if activation of the player has been detected (Yes at Step S401), the user terminal 10 reads the setting file (Step S402).

Subsequently, the user terminal 10 acquires the sound source from the service server 200 (Step S403). Then, the user terminal 10 plays back the sound source based on the setting file while convolving, for example, the personal BRIR, the equipment optimization parameter, and the like with the sound source (Step S404).

During the playback of the sound source, the user terminal 10 determines whether the connected equipment has been changed (Step S405). If the connected equipment has been changed (Yes at Step S405), i.e., if the pair of headphones that is being used by the user has been changed, or if communication has been disconnected, the user terminal 10 changes the setting file (Step S406). For example, the user terminal 10 cancels the status enabling the personal BRIR and the equipment optimization parameter and changes the setting file such that these pieces of information are not able to be used for the playback.

After that, the user terminal 10 determines whether a stop of the playback has been requested by the user (Step S407). If a stop of the playback has not been requested by the user (No at Step S407), the user terminal 10 continues the process of acquiring the sound source from the service server 200 in order to continue the playback.

In contrast, if a stop of the playback has been requested from the user (Yes at Step S407), the user terminal 10 stops the playback of the sound source (Step S408).

2. Modification

The information processing system 1 described above may also be performed with various kinds of embodiments other than the embodiments described above. Therefore, in the following, a modification of the embodiment will be described.

2-1. Mode of the Information Processing System

In the embodiment, the one-time URL is used as an example of the acquisition purpose address of the personal BRIR or the equipment optimization parameter; however, the example is not limited to this and any method may also be used as long as the method in which the second app can acquire data from the cloud server 100 is used. Furthermore, after having provided the personal BRIR to the user terminal 10 via the one-time URL, the cloud server 100 may also delete the provided personal BRIR or may also hold the provided personal BRIR in a certain period of time.

In the embodiment, an example in which the cloud server 100 generates the personal BRIR has been described. However, the personal BRIR may also be generated by the user terminal 10 instead of the cloud server 100. In this case, the cloud server 100 may also hold the personal BRIR uploaded from the user terminal 10 and issues, if a request is received, the acquisition purpose address.

In the embodiment, a description has been given with the assumption that the cloud server 100 is set up in a cloud network; however, the example is not limited to this. The cloud server 100 may also set up in a network, such as a local area network (LAN) or the like as long as the cloud server 100 can communicate with the user terminal 10.

The cloud server 100 may also acquire the identification information on the user at the time of generating the personal BRIR, associate the identification information with the personal BRIR, and hold the personal BRIR. In this case, the cloud server 100 can provide the personal BRIR to the second app without receiving an upload of the personal BRIR from the first app at every activation.

In the embodiment, the cloud server 100 has been described as a single server; however, the cloud server 100 may also be constituted from a plurality of server devices. For example, the cloud server 100 may also be divided into a generating server that generates the personal BRIR and a providing server that issues the acquisition purpose address of the personal BRIR or that provides the personal BRIR.

In the embodiment, an example in which the first app and the second app are installed in the user terminal 10 is described; however, the first app and the second app may also be apps installed in different devices. For example, the user terminal 10 may also hold only the function of the first app and perform a playback or the like of the sound source by controlling the second app installed in a smart speaker or the like that is another device.

2-2. Mode of Playback of Sound Source

If the cloud server 100 does not hold the personal BRIR of the user or the equipment optimization parameter, the cloud server 100 may also send an average BRIR of a plurality of users or the standard parameter that does not depends on specific equipment to the user terminal 10.

Figure 10:
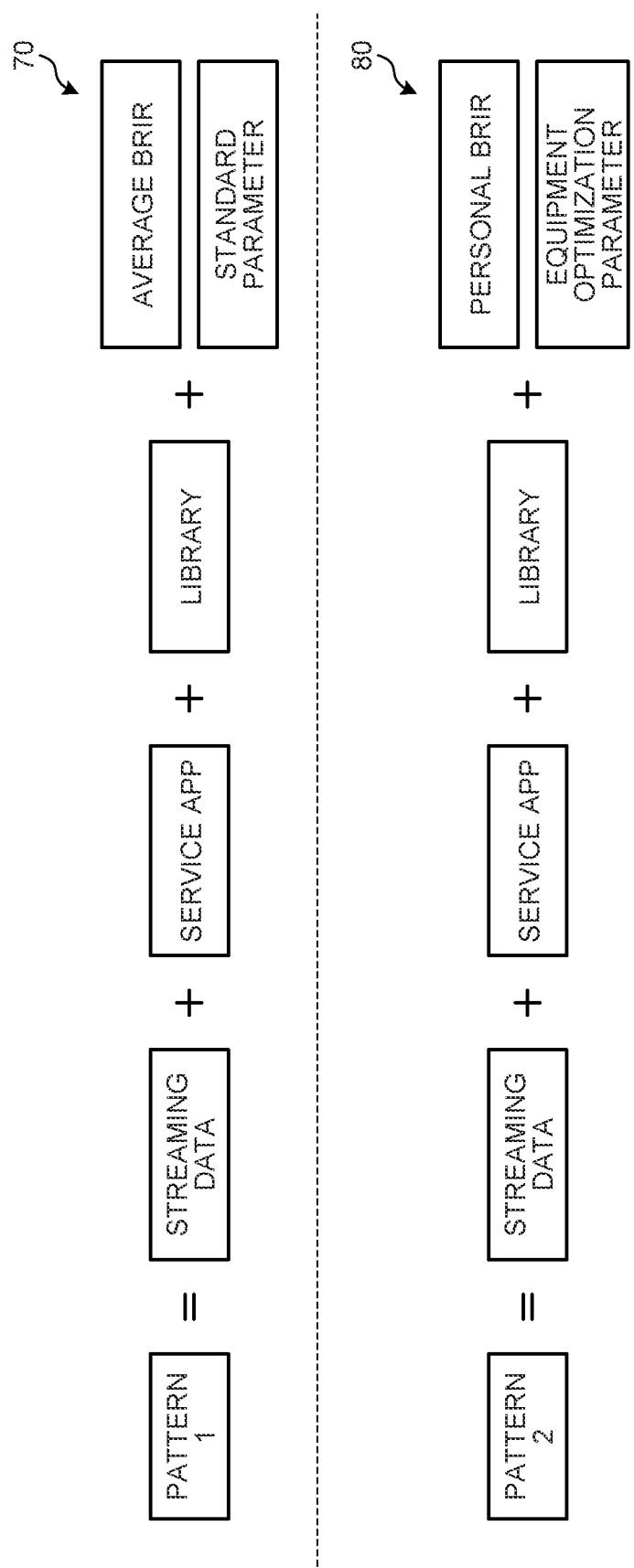
FIG. 10 is a conceptual diagram illustrating a usage mode of a head-related transfer function according to a modification.

This point will be described with reference to FIG. 10. FIG. 10 is a conceptual diagram illustrating a usage mode of a head-related transfer function according to the modification.

As illustrated in FIG. 10, when the sound source is played back in the second app, for example, modes of a pattern 1 and a pattern 2 can be conceivable. The pattern 1 indicates a case in which the personal BRIR or the equipment optimization parameter is not able to be used, such as a case in which the equipment is not able to be recognized. Specifically, the pattern 1 is operated by a combination 70 of the streaming data, the service app (playback purpose app), the library, the average BRIR, and the standard parameter. In contrast, the pattern 2 indicates a case in which the equipment can be recognized and the parameter associated with the equipment is present. Specifically, the pattern 2 is operated by a combination 80 of the streaming data, the service app, the library, the personal BRIR, and the equipment optimization parameter.

2-3. Use of Parameter

The user terminal 10 may also previously acquire the equipment optimization parameter associated with a plurality of equipments instead of acquiring the equipment optimization parameter at every playback. In this case, the user terminal 10 can specify an optimized parameter of the subject equipment based on the identifier of the connected equipment and perform a playback or the like by using the specified parameter. Furthermore, the user terminal 10 may also submit a list of, for example, equipment parameters owned by the user terminal 10 to the user and allow the user to select a parameter. Consequently, even if the user only holds, for example, a Passive headphone, the user terminal 10 can perform a playback by using the own personal BRIR and the equipment optimization parameter.

Furthermore, in the embodiment, a description has been given of an example in which the user terminal 10 (the second app) does not acquire the equipment optimization parameter of, for example, the pair of headphones or the like that is Passive. However, the user terminal 10 may also acquire the equipment optimization parameter of the equipment that does not have a communication function, such as a Passive headphone. In this case, the user manually selects the name or the like of the equipment by using the first app. Furthermore, the list of the names or the like of the equipment is provided from the cloud server 100 to the user terminal 10. Then, the user terminal 10 acquires, from the cloud server 100, the acquisition purpose address associated with the equipment optimization parameter of the equipment selected by the user.

Then, the user terminal 10 provides the acquired acquisition purpose address to the second app. Consequently, the second app can acquire the acquisition purpose address of the equipment optimization parameter related to the Passive headphone or the like. In this case, because the process at Step S305 illustrated in FIG. 8 is a branch to "Yes", the user can enjoy a music playback using the personal BRIR or the equipment optimization parameter even in a case of Passive headphone. Furthermore, the user terminal 10 may also appropriately perform, in conformity to the situation of the user, not only a music playback by using the personal BRIR and the equipment optimization parameter, but also a music playback in combination with various functions and variables, such as a music playback that uses only the personal BRIR (the standard parameter instead of the equipment optimization parameter) or a music playback that uses only an average BRIR.

When the cloud server 100 generates a personal BRIR from the personal HRTF, the cloud server 100 may also convolve different RIRs (for example, RIRs in conformity to a room environment of the user, etc.) in accordance with, for example, the location or the situation of the user. Consequently, the cloud server 100 can provide the personal BRIR in further conformity to the situation of the user to the user. In this case, instead of the cloud server 100 generating the personal BRIR, user terminal 10 itself that has acquired the plurality of RIRs may also specify the RIR in conformity to the environment and perform convolution with the personal HRTF.

2-4. Mode of Equipment

In the embodiment, a description has been given of an example in which the pair of headphones 50 is connected to the user terminal 10 by using Bluetooth. However, the connection of the equipment, such as the pair of headphones 50, is not limited to Bluetooth and the connection may also be established based on various communication standards.

3. Another Embodiment

The processes according to each of the embodiments described above may also be performed with various kinds of embodiments other than the embodiments described above.

Furthermore, of the processes described above in each of the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, various kinds of information illustrated in each of the drawings is not limited to the information illustrated in the drawings.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, each of the embodiments and the modifications described above can be used in any appropriate combination as long as the processes do not conflict with each other.

Furthermore, the effects described in this specification is only exemplified and is not limited, and other effects may also be possible.

4. Effects of the Information Processing Apparatus According to the Present Disclosure As described above, the information processing apparatus (the user terminal 10 in the embodiment) according to the present disclosure includes an executing unit (the executing unit 163 in the embodiment) and a providing unit (the providing unit 164 in the embodiment). The executing unit associates a head-related transfer function (a personal HRTF or a personal BRIR in the embodiment) corresponding to a user with an identifier that identifies equipment that is used by the user. The providing unit provides the head-related transfer function and the identifier associated with the head-related transfer function to the providing destination to which the head-related transfer function corresponding to the user is provided.

In this way, the information processing apparatus according to the present disclosure identifies the equipment that is connected at the present moment in an environment in which the head-related transfer function is going to be used. Consequently, because the information processing apparatus can recognize that inappropriate equipment is connected or the like at the time of playback, it is possible to appropriately use the head-related transfer function.

Furthermore, the providing unit provides the head-related transfer function to the providing destination by sending, to the providing destination, a one-time URL that is used by the providing destination to acquire the head-related transfer function. Consequently, the information processing apparatus can also provide the head-related transfer function to the providing destination that has OS constraints or the like.

Furthermore, the providing unit provides, together with the identifier, a variable in accordance with the equipment at the time the variable is used together with the head-related transfer function to the providing destination. Consequently, the information processing apparatus can perform an optimum playback in accordance with the equipment.

Furthermore, the providing unit provides the variable to the providing destination by sending, to the providing destination, the one-time URL that is used by the providing destination to acquire the variable. Consequently, the information processing apparatus can also provide the variable, such as an equipment optimization parameter, to the providing destination that has OS constraints or the like.

Furthermore, the providing unit provides the variable to the providing destination when communication between the information processing apparatus and the equipment has been established. Consequently, the information processing apparatus can prevent the variable from being used by the equipment that is inappropriate for the acquired variable at the time of playback of music, thereby preventing an inappropriate playback.

Furthermore, the information processing apparatus according to the present disclosure includes an acquiring unit (the acquiring unit 166 in the embodiment), a determination unit (the determination unit 167 in the embodiment), and a setting unit (the setting unit 168 in the embodiment). The acquiring unit acquires the head-related transfer function corresponding to the user and the identifier associated with the head-related transfer function. The determination unit determines a match between the identifier associated with the head-related transfer function and the identifier that identifies the equipment used by the user. When the identifier associated with the head-related transfer function matches the identifier that identifies the equipment used by the user, the setting unit sets the head-related transfer function so as to enable the head-related transfer function.

In this way, the information processing apparatus according to the present disclosure determines a match between the associated equipment at the time point in which the head-related transfer function has been acquired and the equipment that is actually connected, and then, sets the head-related transfer function to be enabled based on the result of determination. Consequently, the information processing apparatus can prevent the head-related transfer function from being used by inappropriate equipment at the time of playback.

Furthermore, the acquiring unit acquires the head-related transfer function via the one-time URL that is used to acquire the head-related transfer function. Consequently, the information processing apparatus can acquire the head-related transfer function in also a case of OS constraints or the like.

Furthermore, the acquiring unit acquires, together with the identifier, a variable in accordance with the equipment at the time the variable is used together with the head-related transfer function. Consequently, the information processing apparatus can perform an optimum playback in accordance with the equipment.

Furthermore, the acquiring unit acquires a variable via the one-time URL that is used to acquire the variable.

Consequently, the information processing apparatus can also acquire the variable even in a case of OS constraints or the like.

Furthermore, the determination unit determines that the equipment in which communication with the information processing apparatus has been established is the equipment that is used by the user. When the identifier associated with the head-related transfer function matches the identifier that identifies the equipment used by the user, the setting unit sets the variable so as to enable the variable. Consequently, because the information processing apparatus can determine whether equipment that is different from the equipment associated with the acquired head-related transfer function is connected at the time of playback, the information processing apparatus can prevent the use of variable with respect to inappropriate equipment.

Furthermore, when the identifier associated with the head-related transfer function does not match the identifier that identifies the equipment used by the user, the setting unit sets the head-related transfer function or the variable so as not to enable the head-related transfer function or the variable. Consequently, the information processing apparatus can prevent the use of variable or the like that is inappropriate to the equipment.

5. Hardware Configuration

Figure 11:
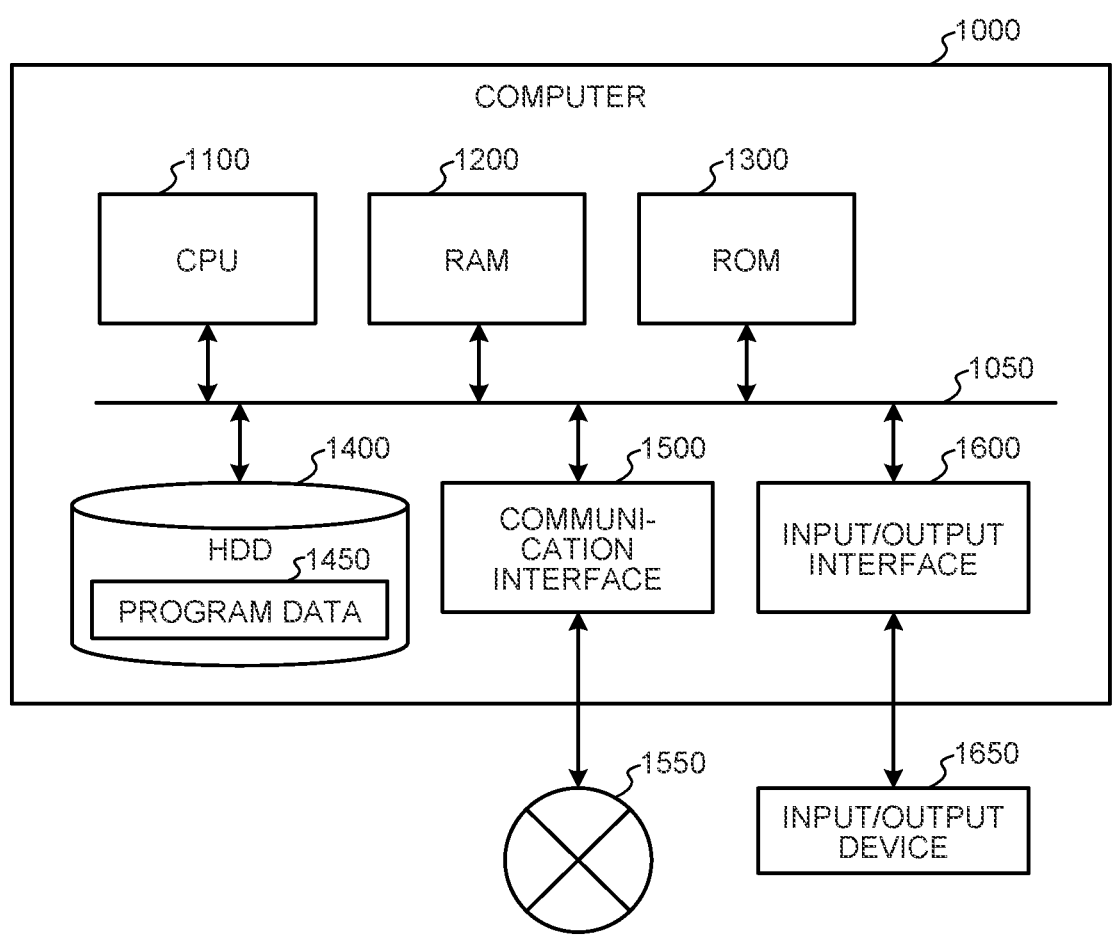
FIG. 11 is a hardware configuration diagram illustrating an example of a computer that implements a function of an information processing apparatus.

The information devices, such as the user terminal 10, the pair of headphones 50, the cloud server 100, and the service server 200, according to each of the embodiments described above are implemented by a computer 1000 having the configuration illustrated in, for example, FIG. 11. In the following, a description will be given by using the user terminal 10 according to the embodiment as an example. FIG. 11 is a diagram illustrating the hardware configuration of the computer 1000 that implements the function of the user terminal 10. The computer 1000 includes a CPU 1100, a RAM 1200, a read only memory (ROM) 1300, a hard disk drive (HDD) 1400, a communication interface 1500, and an input/output interface 1600. Each of the units in the computer 1000 is connected by a bus 1050.

The CPU 1100 operates based on the programs stored in the ROM 1300 or the HDD 1400 and controls each of the units. For example, the CPU 1100 loads the programs stored in the ROM 1300 or the HDD 1400 into the RAM 1200 and executes the processes associated with various kinds of programs.

The ROM 1300 stores therein a boot program of a Basic Input Output System (BIOS) or the like that is executed by the CPU 1100 at the time of starting up the computer 1000 or a program or the like that depends on the hardware of the computer 1000.

The HDD 1400 is a computer readable recording medium that records therein, in a non-transitory manner, the programs executed by the CPU 1100, data that is used by these programs, and the like. Specifically, the HDD 1400 is a recording medium that records therein the information processing program according to the present disclosure that is an example of program data 1450.

The communication interface 1500 is an interface for connecting to an external network 1550 (for example, the Internet) by the computer 1000. For example, the CPU 1100 receives data from another device via the communication interface 1500 and sends data generated by the CPU 1100 to the other device.

The input/output interface 1600 is an interface for connecting an input/output device 1650 and the computer 1000. For example, the CPU 1100 receives data from an input device, such as a keyboard or a mouse, via the input/output interface 1600. Furthermore, the CPU 1100 sends data to an output device, such as a display, a speaker, a printer, via the input/output interface 1600. Furthermore, the input/output interface 1600 may also function as a media interface that reads programs or the like recorded in a predetermined recording medium (media). An example of one of the media mentioned here includes an optical recording medium, such as a digital versatile disc (DVD) and a phase change rewritable disk (PD), a magneto-optical recording medium, such as magneto-optical disk (MO), a tape medium, a magnetic recording medium, a semiconductor memory, or the like.

For example, when the computer 1000 functions as the user terminal 10 according to the embodiment, the CPU 1100 in the computer 1000 implements the function of the control unit 16 or the like by executing the information processing program loaded onto the RAM 1200. Furthermore, the HDD 1400 stores therein the information processing program according to the present disclosure and the data included in the storage unit 15. Furthermore, the CPU 1100 reads the program data 1450 from the HDD 1400; however, as another example, the CPU 1100 may also acquire these programs from the other device via the external network 1550.

Furthermore, the present technology can also be configured as follows.

(1)

An information processing apparatus comprising:

an executing unit that associates a head-related transfer function corresponding to a user with an identifier that identifies equipment that is used by the user; and a providing unit that provides the head-related transfer function and the identifier associated with the head-related transfer function to a providing destination to which the head-related transfer function corresponding to the user is provided.

(2)

The information processing apparatus according to (1), wherein the providing unit provides the head-related transfer function to the providing destination by sending, to the providing destination, a one-time URL that is used by the providing destination to acquire the head-related transfer function.

(3)

The information processing apparatus according to (1) or (2), wherein the providing unit provides, together with the identifier, a variable in accordance with the equipment at the time the variable is used together with the head-related transfer function to the providing destination.

(4)

The information processing apparatus according to (3), wherein the providing unit provides the variable to the providing destination by sending, to the providing destination, a one-time URL that is used by the providing destination to acquire the variable.

(5)

The information processing apparatus according to (3) or (4), wherein the providing unit provides the variable to the providing destination when communication between the information processing apparatus and the equipment has been established.

(6)

An information processing method that causes a computer to execute a process comprising:

associating a head-related transfer function corresponding to a user with an identifier that identifies equipment that is used by the user; and providing the head-related transfer function and the identifier associated with the head-related transfer function to a providing destination to which the head-related transfer function corresponding to the user is provided.

(7)

An information processing program that causes a computer to function as:

an executing unit that associates a head-related transfer function corresponding to a user with an identifier that identifies equipment that is used by the user; and a providing unit that provides the head-related transfer function and the identifier associated with the head-related transfer function to a providing destination to which the head-related transfer function corresponding to the user is provided.

(8)

An information processing apparatus comprising:

an acquiring unit that acquires a head-related transfer function corresponding to a user and an identifier associated with the head-related transfer function;

a determination unit that determines a match between the identifier associated with the head-related transfer function and an identifier that identifies equipment that is used by the user; and a setting unit that sets, when the identifier associated with the head-related transfer function matches the identifier that identifies the equipment that is used by the user, the head-related transfer function so as to enable the head-related transfer function.

(9)

The information processing apparatus according to (8), wherein the acquiring unit acquires the head-related transfer function via a one-time URL that is used to acquire the head-related transfer function.

(10)

The information processing apparatus according to (8) or (9), wherein the acquiring unit acquires, together with the identifier, a variable in accordance with the equipment at the time the variable is used together with the head-related transfer function.

(11)

The information processing apparatus according to (10), wherein the acquiring unit acquires the variable via a one-time URL that is used to acquire the variable.

(12)

The information processing apparatus according to (10) or (11), wherein the determination unit determines that equipment in which communication with the information processing apparatus has been established is the equipment that is used by the user, and the setting unit sets, when the identifier associated with the head-related transfer function matches the identifier that identifies the equipment that is used by the user, the variable so as to enable the variable.

(13)

The information processing apparatus according to any one of (10) to (12), wherein the setting unit sets, when the identifier associated with the head-related transfer function does not match the identifier that identifies the equipment that is used by the user, the head-related transfer function or the variable so as not to enable the head-related transfer function or the variable.

(14)

An information processing method that causes a computer to execute a process comprising:

acquiring a head-related transfer function corresponding to a user and identifier associated with the head-related transfer function;

determining a match between the identifier associated with the head-related transfer function and an identifier that identifies equipment that is used by the user; and setting, when the identifier associated with the head-related transfer function matches the identifier that identifies the equipment that is used by the user, the head-related transfer function so as to enable the head-related transfer function.

(15)

An information processing program that causes a computer to function as:

an acquiring unit that acquires a head-related transfer function corresponding to a user and an identifier associated with the head-related transfer function;

a determination unit that determines a match between the identifier associated with the head-related transfer function and an identifier that identifies equipment that is used by the user; and a setting unit that sets, when the identifier associated with the head-related transfer function matches the identifier that identifies the equipment that is used by the user, the head-related transfer function so as to enable the head-related transfer function.

REFERENCE SIGNS LIST 1 information processing system
10 user terminal
11 communication unit
12 input unit
13 display unit
14 detecting unit
15 storage unit
151 BRIR table
152 parameter table
16 control unit
161 first app control unit
162 generating unit
163 executing unit
164 providing unit
165 second app control unit
166 acquiring unit
167 determination unit
168 setting unit
169 playback unit
50 headphone
100 cloud server
200 service server

What is claimed is:

1. An information processing apparatus, comprising:
a user terminal;
an executing unit running on the user terminal, wherein the executing unit associates a head-related transfer function corresponding to a user with an identifier that identifies equipment that is used by the user and that is operatively connected to the user terminal; and
a providing unit running on the user terminal, wherein the providing unit provides the head-related transfer function and the identifier associated with the head-related transfer function to a providing destination on the user terminal by sending, from the providing unit to the providing destination, an acquisition purpose address that is used by the providing destination to acquire the head-related transfer function and the identifier associated with the head-related transfer function.

2. The information processing apparatus according to claim 1, wherein the acquisition purpose address a one-time universal resource locator (URL).

3. The information processing apparatus according to claim 1, wherein the providing unit provides, together with the identifier, a variable in accordance with the equipment when the variable is used together with the head-related transfer function to the providing destination.

4. The information processing apparatus according to claim 3, wherein the acquisition purpose address is a one-time universal resource locator (URL).

5. The information processing apparatus according to claim 3, wherein the providing unit provides the variable to the providing destination when communication between the information processing apparatus and the equipment has been established.

6. An information processing method that causes a computer to execute a process comprising:
associating a head-related transfer function corresponding to a user with an identifier that identifies equipment that is used by the user; and
providing the head-related transfer function and the identifier associated with the head-related transfer function from a providing unit running on the computer to a providing destination running on the computer, wherein the providing unit provides the head-related transfer function and the identifier associated with the head-related transfer function to the providing destination by sending, from the providing unit to the providing destination, an acquisition purpose address that is used by the providing destination to acquire the head-related transfer function and the identifier associated with the head-related transfer function.

7. An information processing apparatus comprising:
a user terminal;
an acquiring unit running on the user terminal that acquires a head-related transfer function corresponding to a user and an identifier associated with the head-related transfer function;
a determination unit running on the user terminal that determines a match between the identifier associated with the head-related transfer function and an identifier that identifies equipment that is used by the user; and
a setting unit running on the user terminal that sets, when the identifier associated with the head-related transfer function matches the identifier that identifies the equipment that is used by the user, the head-related transfer function so as to enable the head-related transfer function: and
a providing unit running on the user terminal, wherein the providing unit provides the head-related transfer function and the identifier associated with the head-related transfer function to the acquiring unit on the user terminal by sending, from the providing unit to the acquiring unit, an acquisition purpose address that is used by the acquiring unit to acquire the head-related transfer function and the identifier associated with the head- related transfer function.

8. The information processing apparatus according to claim 7, wherein the acquisition purpose address a one-time universal resource locator (URL).

9. The information processing apparatus according to claim 7, wherein the acquiring unit acquires, together with the identifier, a variable in accordance with the equipment when the variable is used together with the head-related transfer function.

10. The information processing apparatus according to claim 9, wherein the acquiring unit acquires the variable via a one-time URL that is used to acquire the variable.

11. The information processing apparatus according to claim 9, wherein
the determination unit determines that equipment in which communication with the information processing apparatus has been established is the equipment that is used by the user, and
the setting unit sets, when the identifier associated with the head-related transfer function matches the identifier that identifies the equipment that is used by the user, the variable so as to enable the variable.

12. The information processing apparatus according to claim 9,
wherein the setting unit sets, when the identifier associated with the head-related transfer function does not match the identifier that identifies the equipment that is used by the user, the head-related transfer function or the variable so as not to enable the head-related transfer function or the variable.

13. The information processing method according to claim 6, wherein the acquisition purpose address is a one-time universal resource locator (URL).

* * * * *